Oct. 1, 1968 R. A. KLEIST 3,403,867

TAPE TRANSPORT

Filed Oct. 24, 1965 2 Sheets-Sheet 1

ROBERT A. KLEIST,
*INVENTOR.*

BY Leon D. Rosen
Albert Rosen
ATTORNEYS

ROBERT A. KLEIST,
INVENTOR.

BY Leon D. Rosen
Albert Rosen
ATTORNEYS

United States Patent Office 3,403,867

Patented Oct. 1, 1968

3,403,867
TAPE TRANSPORT

Robert A. Kleist, Anaheim, Calif., assignor to Dartex, Inc., Santa Ana, Calif.

Filed Oct. 24, 1965, Ser. No. 504,344
4 Claims. (Cl. 242—55.12)

ABSTRACT OF THE DISCLOSURE

A tape transport which achieves small size by utilizing a flangeless take-up hub located close to the supply reel so that tape wound on the hub enters between the supply reel flanges. The tape transport is a high performance type providing controllable tension so the tape wound on the hub remain in place. The transport has a direct drive capstan constantly engaging the tape in cooperation with a pressure roller, and includes a cover, means for latching the pressure roller away from the cover when the cover is in an open position, and a mechanism for automatically moving the pressure roller from a latched position against the capstan when a transport cover is closed.

This invention relates to transport mechanisms and, while not limited thereby, relates to improvements in magnetic tape transports.

In the design of tape transports, it is usually an objective to provide a mechanism which is as compact and easily operated as possible. The compactness of a tape transport is often limited by the fact that there must be a file reel and a take-up reel positioned side-by-side. Thus, in order to use five inch diameter reels it is generally necessary to provide a transport having a width of at least 10 inches. Usually only the file reel is removed from the machine in the course of its use, but a sufficiently large take-up reel must be provided to temporarily store all of the tape on the largest file reel which may be used. While it is possible to position the file and take-up reels on the same axis, one below the other, the difficulties of conducting tape between reels located on different levels or planes is enormous and generally impractical. A means for reducing the necessary width of tape transports would be very useful in their design.

Another problem which often limits the utility of tape transports is the difficulty of threading the tape through the machine. This problem is especially apparent in the case of higher performance transports which utilize a greater number of tape guides through which the tape must be threaded. Threading of tape past the various guides, read and write head, capstan and buffer is difficult for persons who are not familiar with the tape transport. The apparent difficulty of threading discourages persons from attempting to learn how to operate the transport, and sometimes causes threading errors.

Another problem also relating to threading of tape, is the problem of "starting" the tape on a take-up reel or the like. The end of the tape generally must be placed between the flanges of a take-up reel and up to its hub. The tape end then must be inserted into a slot in the reel hub. Finally, the take-up reel must be rotated more than one turn to cause a covering layer of tape to hold the tape end in the slot; in the latter operation care must be exercised to apply very little tension to the tape to prevent pulling the tape end out of the slot.

Still another problem limiting the ease of use of tape transports is the general lack of a simple and rapidly operable means for holding reels on the turntable. Such a holding means must hold the reel flush against the turntable and centered thereon in any position of the transport. It is also desirable to provide rubber or other soft material on any fastener surfaces which apply appreciable contact force to the reel over a relatively small area. A soft material prevents very highly concentrated forces which could crack the plastic material of which most reels are constructed.

Accordingly, one object of the present invention is to provide transports which are more compact and easier to operate than heretofore.

Another object is to provide a transport which enables the placing of a supply and take-up reel closer together than heretofore.

Another object is to provide a tape transport which enables the facile threading of tape along a path between supply and take-up reel means.

Yet another object is to provide a take-up reel mechanism for enabling the facile starting of tape thereon.

Still another object is to provide a reel hold-down mechanism for holding reels in place on a tape transport turntable, which is characterized by simple construction and facile and reliable operation.

The foregoing and other objects are realized by a tape transport including a turntable for holding a file reel, and including a take-up reel consisting of a hub without flanges. The distance between the center of the take-up hub and the center of the file reel turntable is generally less than the diameter of the largest file reel which can be used in the mechanism. When tape is removed from the file reel in reading or recording, and the circle of tape on the take-up hub approaches its maximum diameter, the tape on the hub enters between the flanges of the file reel. Of course, when the tape on the hub enters between the file reel flanges, there is no interference with tape on the file reel because the small quantity of tape that remains there is located near the center of the file reel.

The tape is easily started on the take-up hub because the hub comprises a series of posts placed in a circle which make the hub self-threading. The absence of flanges on the hub eliminates the necessity for inserting tape ends between flanges to start the tape.

The tape is readily threaded along the tape guides, read/write head, and capstan, and into the take-up hub, by covering the tape deck with a panel and providing a slot in the panel into which an end portion of tape from the file reel can be laid. During the laying of tape in the slot, any rollers which may bear against the capstan are withdrawn from the tape path. This is readily accomplished by providing a tape transport cover which is lifted to insert a new file reel, and by providing means to temporarily withdraw the roller from the capstan when the cover is lifted.

In some embodiments of the invention the roller can be manually withdrawn from the capstan when the cover is open, and when the cover is closed the roller is automatically released to bear against the capstan.

The supply reel is held against the turntable by a thumb screw and O-ring combination. The O-ring is of a diameter which enables its wedging into the space between the turntable shaft and file reel, when expanded slightly. The thumb screw can be turned to bear against the O-ring to expand it and wedge it into place. The diameter of the thumb screw is equal to the diameter of the shaft so that the file reel can be readily placed over thumb screw and shaft. After placing the reel on the shaft, the thumb screw is tightened perhaps one turn to expand the O-ring and hold the reel in place.

A better understanding of the invention may be had by reference to the following detailed description taken in conjunction with the accompanying drawings wherein.

Figure 1:
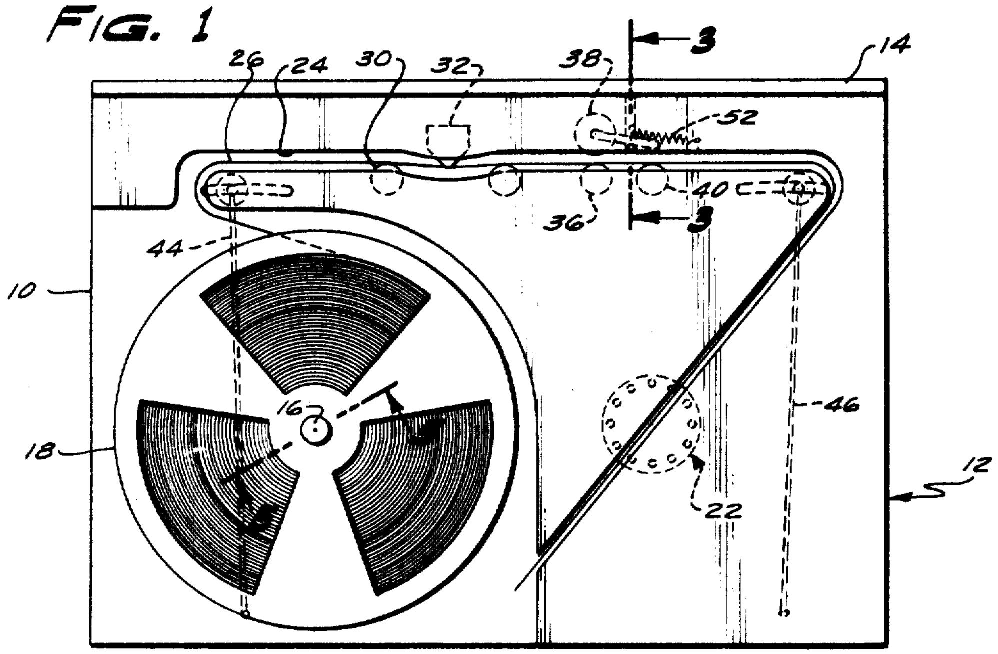
FIG. 1 is a plan view of a tape transport constructed in accordance with the invention, with its cover opened.

A tape transport constructed in accordance with the invention, illustrated in FIG. 1, includes a front panel 10, a guide panel 12 covering a portion of the front panel, and a cover 14 shown in an open position. A shaft and hold-down assembly 16 on one side of the panel holds a file reel 18, and a shaft on the other side holds a take-up hub 22 shown in hidden lines. A slot 24 in the guide panel leads from the file reel to the take-up hub, and tape 26 moves primarily through the slot in transferring between the reel and hub.

Figure 2:
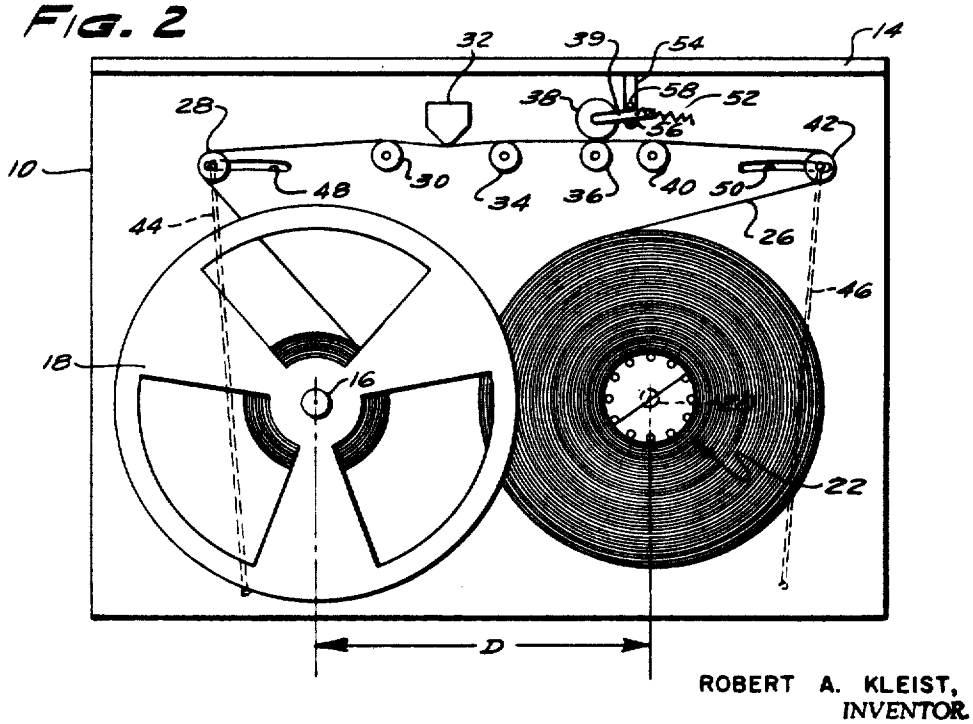
FIG. 2 is a plan view of the transport of FIG. 1 with its guide panel removed, showing the position of the guiding elements when the cover is closed.

A number of guide and other elements lying along the tape path defined by the slot can be more readily seen in FIG. 2, wherein the transport is shown with the guide panel 2 removed. The tape path extends from the file reel 18 around a buffer roller 28, past read and write head 32, between a capstan 36 and a pressure roller 38, around another buffer roller 42, and around the hub 22. Guides 30, 34 and 40 disposed along the tape path aid in accurate guidance of the tape. Movement of tape past the read and write head 32 is closely controlled by rotation of the capstan 36. The tape drive is of a type wherein the pressure roller 38 bears against the capstan 36 at all times except when tape is to be loaded or unloaded from the transport, and the capstan is bidirectionally driven with high acceleration and deceleration to accelerate and decelerate the tape. A more detailed description of this type of tape drive is given in a copending application of Robert A. Kleist, entitled "Tape Transport," Ser. No. 476,286, filed Aug. 2, 1965.

The buffer rollers 28 and 42 are each connected to buffer arms indicated at 44 and 46 through slots 48 and 50 in the front panel 10, the arms being spring biased away from the read head 32. The ends of the slots limit buffer arm movement while tape is loaded in the transport. When the tape is accelerated from file reel 18 toward hub 22 by the capstan, the buffer roller 28 moves toward head 32 to provide a length of tape for movement past the head before the reel 18 can be accelerated to full speed. At the same time, buffer roller 42 moves away from head 32 to take up slack in the tape path until the hub 22 achieves full speed. Similar buffer roller movements occur in stopping tape movement, and in accelerating and decelerating in the opposite direction, from hub to file reel.

Figure 3:
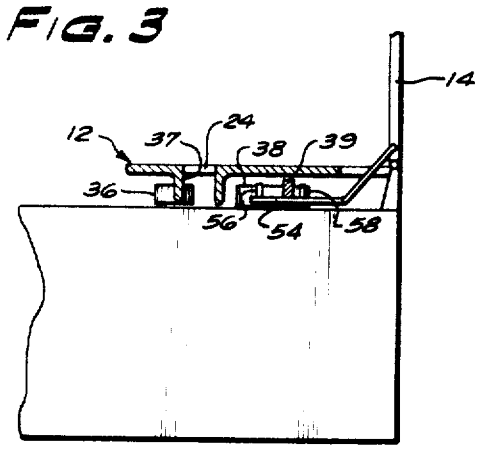
FIG. 3 is a partial sectional view taken along the section III—III of FIG. 1.

In order to load or unload tape, it is necessary to move the pressure roller 38 away from the capstan 36, to enable tape to be placed therebetween. The pressure roller 38 is pressed against the capstan or held away from it by a spring 52 attached to a roller-holding member 39. As shown in FIG. 3, an arm 54 attached to the transport cover 14 carries pins 56 and 58. The pin 56 serves to move the pressure roller away from the capstan 36 when the cover 14 is opened. The pin 58 moves the pressure roller toward the capstan 36 when the cover is closed; the pin 58 moves the roller only part of the way, the spring 52 (not shown in FIG. 3) moving the roller further until it contacts the capstan.

Figure 7:
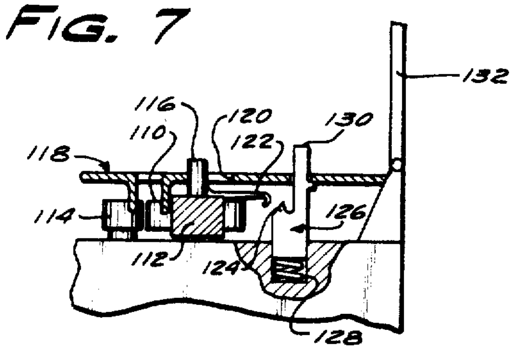
FIG. 7 is a partial sectional view of another embodiment of the invention, showing a novel roller arm operating mechanism.

Another mechanism which may be used to move the roller toward and away from the capstan is illustrated in FIG. 7, which is a partial view taken on a plane which passes through the roller arm. In this mechanism the roller 110 is held by a roller arm 112 and biased by a spring (not shown) toward the capstan 114. A knob 116 extending above the guide panel 118 through a slot 120 therein, enables the roller to be moved manually away from the capstan when tape is to be placed between capstan and roller. A latch bar 122 fixed to the roller arm 112 engages a catch 124 formed on a button 126 to hold the roller away from the capstan. The button 126 is biased upward by a spring 128, and includes an extending portion 130 lying above the guide panel.

When the cover 132 is closed, it presses against the extending portion 130 of the button, to depress the button and release the latching bar 122 from the catch 124. The roller arm 112 then moves the roller 110 against the capstan 114. By this arrangement the tape transport can be operated with the cover opened, which is sometimes desired when testing or adjusting the machine. This creates one additional step in threading (moving the knob 116 before laying tape between capstan and roller) but still enables simple threading.

The hub 22 is constructed of several pins spaced along a circular path. The pins can be shaped in various manners, but the essential requirement is that tape can fall between them easily. When the end portion of the tape 26 is laid between two sets of pins of the hub, as shown in FIG. 1, and the hub is subsequently rotated while the capstan 36 feeds tape toward the hub, the tape is automatically threaded on the hub. Loading of tape in the transport is accomplished by placing a file reel 18 on shaft 16 and unwinding the reel approximately one turn to provide a sufficient length of tape to extend along the slot 24 and past the hub 22. With the cover 14 open, the free end portion of the tape is laid in the slot 24, with the very end of the tape extending past the hub 22 a sufficient distance, which must generally be greater than one-half the diameter of the circular path described by the pins. The cover 14 is then closed, to move the roller 38 against the capstan 36 and grasp the tape therebetween. The tape transport is then ready to operate.

In the transport illustrated, the slot has a slight curvature near the read and record head 32. The curvature provides for slight projection of the head 32 into the portion of the tape path lying between guides 30 and 34 during data transfer, to assure close contact of head 32 and tape. It may be noted that guide strips 37 shown in FIG. 3, are formed in the guide panel 12 and lie on either side of the slot 24. The guide strips extend between guides 30 and 40.

The distance D between the shafts 16 and 20 on which the file reel 16 and hub 22 are mounted, is less than the diameter of the largest file reel which the tape transport is adapted to hold. The largest diameter of file reel which can be held is limited by reel obstructions, such as buffer roller 28 and the sides of the deck 10, which would obstruct any larger reel. As shown in FIG. 2, when most of the tape 26 has been transferred from the file reel to the hub, the tape on the hub enters between the flanges of the file reel. The elimination of flanges on the hub enables the close spacing of the reel and hub. Flanges are not necessary on the hub 22 because the buffer roller 42 accurately guides tape onto the hub, and even in the case of narrow tape such as one-quarter inch wide tape, the tape is moved precisely in the same planes wherein lies the opening between the flanges.

In the usual practice, tape is always stored on file reels, and after reading or recording thereon in a tape transport, the tape is rewound on the file reel for storage. Inasmuch as tape is handled only by the transport when it is on the hub 22, no flanges are necessary to prevent its accidental removal therefrom.

The elimination of flanges makes threading of the tape on the hub easily accomplished by merely lying tape between pins of the hub. Where the take-up reel or hub has flanges, as was the case heretofore, starting of the tape involved insertion of the end of the tape between the flanges and into a slot at the hub. Manipulation of the end of a length of tape to insert it into a narrow slot on the hub of a reel, when access to the hub is blocked by large flanges, is often a difficult and frustrating task. Accordingly, the flangeless, self-threading hub of this invention enables tape threading in a very facile manner.

Figure 4:
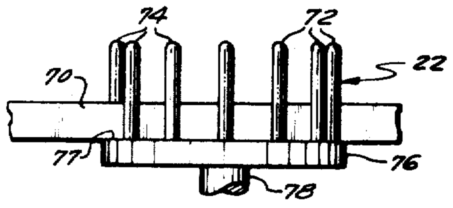
FIG. 4 is an elevation view of the self threading hub of the invention.

A further advantage of the self-threading hub is the fact that the tape extends across and past the hub, so that the tape lays upon itself after only one-half a turn of the hub. Once the end of the tape is wound over a previous layer, it is unlikely to be pulled off the hub. A more detailed illustration of the hub is shown in FIG. 4. The hub includes pins mounted on a disk 76 which is fixed to a shaft 78 driven by a reel motor (not shown). The figure shows an end portion 70 of the tape lying between two sets of pins 72 (one pin of this set is hidden) and 74. Often the end of the tape 70 does not lie against the tape holding side 77 of the disk 76; however, tape guidance by the buffer roller 42 causes tape winding on the hub in the same plane as the tape supply on the supply reel, and after several turns the layers of tape on the hub are in the same plane as those on the supply reel, and lie against the side 77.

As shown in the figures, the use of a flangeless hub has the important advantage of enabling more compact tape transport design by reducing the necessary width of the transport. Formerly, the transport width had to be at least twice the diameter of the largest reel to be accommodated, in order to enable the placement of the file and take-up reels side-by-side. The present flangeless take-up hub, by enabling tape on the hub to enter between the flanges of the supply reel, enables the design of transports of smaller width. The least transport width theoretically possible with a flangeless hub is approximately equal to one and one-half times the diameter of tape on the file reel; a minimum width is possible where the take-up hub is of small diameter and is located near the periphery of the file reel. Generally, the hubs have appreciable diameter and are spaced from the file reel periphery so that the saving in transport width is not as great as 25%. However, substantial savings in width are possible, without the sacrific of efficiency or reliability, and, in fact with certain advantages such as simplicity of threading and starting of the tape on the take-up hub or reel. Accordingly, the hub of this invention is of substantial utility in transport construction.

While a hub constructed of numerous pins is shown, many other designs can be employed. In fact, a hub with flanges can be used if there is at least one slot in the upper, or radially outward flange (which would be furthest from the tape deck 10), and where the slot extends from the radially outer edge of the flange to near the center of the hub. Preferably, the slot or opening between pin means extends diametrically across the hub to enable easier laying of tape therein and allow for securing of tape on the hub after only one-half turn of the hub. Also, the flanges, if any, are preferably of substantially smaller diameter than that of the largest file reel which may be used, to enable placement of supply and take-up shafts close together. Many openings, such as those provided by the multiple pin hub of the figures, is especially desirable in that it provides many paths across the hub and therefore enables laying of tape on the hub without the need for finding a narrow slot, particularly where most of the hub may be covered by a panel as in FIG. 1. In any case, in order to allow for initial threading by merely laying the tape end portion in a guide panel slot, the pins or other projections of the hub must provide a path across the hub (or to its center portion) which is unblocked in an axial direction outwardly from the tape holding side 77 to the guide panel slot.

Figure 5:
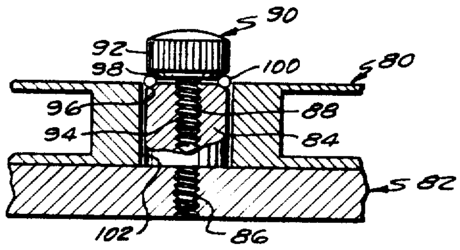
FIG. 5 is a partial, sectional view taken on the line V—V of FIG. 1, wherein the hold-down knob is loosened.
Figure 6:
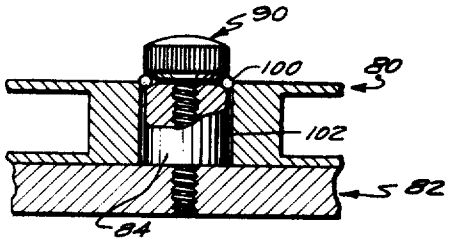
FIG. 6 is a view of the same area as FIG. 5, wherein the hold-down knob is tightened.

The hold-down knob assembly, shown in FIGS. 5 and 6 provide a rapid means for installing a file reel 80 on a tape transport turntable 82. The assembly comprises a short shaft 84 having a screw portion 86 threadably fastened to the turntable and a threaded hole 88 for receiving a knob 90. The hub has a knurled head 92 and a threaded stud 94 engaged in hole 88 of the shaft. The top of the shaft 84 has an outer beveled rim 96, and the bottom of the knob 90 has a corresponding beveled rim 98. An elastomeric washer 100 in the shape of an O-ring is disposed between the beveled surfaces of the shaft and knob.

The outer diameter of the shaft 84 and knob 90 are each slightly smaller than the diameter of the central hole 102 in the reel 80. The outer diameter of the washer 100, in its unstretched or uncompressed state, is approximately the same diameter as the shaft and knob, but may be slightly larger.

A file reel is installed by merely placing it over the knob 90, washer 100 and shaft 84, into a position against the turntable 82. The knob 90 is then tightened perhaps one full turn. In tightening the knob, the washer 100 is compressed between the two beveled rims 98 and 96 of the knob and shaft, and the washer is automatically forced into the space between reel 80 and shaft 84, as shown in FIG. 6. In this position, the reel 80 is held firmly in place against the reel turntable and centered about the shaft 84. The only concentrated hold-down force applied to the reel 80 is applied by the elastomeric washer 100. Thus, the reel 80, which is generally constructed of plastic, is unlikely to be damaged if the hold-down knob 90 is screwed tightly against the washer. Release of the reel 80 is accomplished by simply unscrewing the knob 90 about one turn, to allow the washer 100 to contract.

While an elastomeric washer of O-ring shape is shown in combination with beveled surfaces in the figures, other forms can be utilized. For example, a washer of plate-like shape with a small hole in the center, can be used in conjunction with a knob and shaft which are flat. Compression of the washer by turning the knob forces the washer to expand radially and hold a reel in place. Another alternative is to use a spiral wound spring in an O-ring shape, which is expanded in a manner smiliar to that of the O-ring in the figure. The expanding member need not have a washer or ring shape, but can consist of pieces of expandable material or devices which can accomplish the same radial expansion and contraction by the turning of a knob which is smaller than the hole in the reel (to allow the reel to slip over the hub).

It should be understood that various changes in the details which have been herein described and illustrated in order to explain the nature of the invention, may be made by those skilled in the art, within the principle and scope of the invention as expressed in the appended claims.

I claim:

1. In a tape transport including a capstan and a pressure roller moveable toward and away from said capstan, the improvement comprising:

knob means connected to said roller for manually moving it away from said capstan;

latching means for holding said roller away from said capstan;

latch release means connected to said latching means for releasing said latching means and enabling said roller to move towards said capstan; and cover means mounted on said transport for covering and uncovering said transport, and for operating said latch release means when said cover is moved to a position wherein it covers said transport.

2. In a tape transport including a capstan and pressure roller normally holding tape between them and a cover moveable over the transport deck, the improvement comprising:

holding means for holding said pressure roller, said holding means mounted for movement toward and away from said capstan;

bias means connected to said holding means for biasing it towards said capstan;

latching means engageable with said holding means for retaining said holding means away from said capstan;

release means engageable with said latching means for releasing said holding means therefrom, to allow said holding means to move toward said capstan;

said cover mounted to operate said release means when said cover is closed and to disengage from said release means when said cover is opened; and knob means attached to said holding means for enabling movement of said holding means away from said capstan when said cover is in an open position.

3. The improvement in a tape transport as defined in claim 2 wherein:

said latching means comprises a member mounted for movement toward and away from said deck, a spring mounted adjacent to said member for biasing said member away from said deck, and a hook on said member which engages said holding means when said holding means is in a position away from said capstan and said member is in a position away from said deck;

said release means comprises a button mounted on said member and extending away from said deck, for enabling contact between said button and said operating means when said cover is closed over said deck; and said cover includes a portion which moves onto said button when said cover is closed.

4. A tape transport comprising:

a tape deck;

a supply reel shaft rotatably mounted on said deck for holding a supply reel of a predetermined maximum radius;

a take-up shaft rotatably mounted on said deck at a distance from said supply reel shaft which is less than twice said predetermined maximum radius;

buffer means mounted on said deck for maintaining a tape tension at more than a predetermined minimum level;

means for maintaining said buffer means operative during both winding of tape and periods during which said tape is stationary;

take-up hub means mounted on said take-up shaft, said hub means being free of flange portions at radii from said take-up shaft greater than the distance between said supply and take-up shafts minus said predetermined radius;

said deck being free of tape edge support means at distances from said take-up shaft less than said predetermined maximum radius.

References Cited

UNITED STATES PATENTS

| | | | |
|---|---|---|---|
| 2,862,674 | 12/1958 | Herrmann | 242—55.12 |
| 2,960,278 | 11/1960 | Tronslin | 242—68.3 |
| 2,992,787 | 7/1961 | Craig | 242—68.3 X |
| 3,006,650 | 10/1961 | Ellmore. | |
| 3,083,927 | 4/1963 | Prosin | 242—68.3 |
| 3,167,267 | 1/1965 | Crane | 242—55.13 |
| 3,191,881 | 6/1965 | Campbell et al. | 242—55.13 |
| 3,265,318 | 8/1966 | Ellmore | 242—74 |

OTHER REFERENCES

German printed application No. 1,144,939, published Mar. 7, 1963, Rennspies.

GEORGE F. MAUTZ, *Primary Examiner.*